(No Model.)  2 Sheets—Sheet 1.
A. CALDWELL.
AGRICULTURAL IMPLEMENT.

No. 502,032.   Patented July 25, 1893.

WITNESSES:
John Buckler,
Isabel Chester.

INVENTOR
Alex Caldwell,
BY A. M. Pierce,
ATTORNEY (No Model.) 2 Sheets—Sheet 2.

A. CALDWELL.
AGRICULTURAL IMPLEMENT.

No. 502,032. Patented July 25, 1893.

WITNESSES:
John Buckler,
Isabel Chester.

INVENTOR
Alex Caldwell,
BY A. M. Pierce,
ATTORNEY

UNITED STATES PATENT OFFICE.

ALEXANDER CALDWELL, OF ESSEX, IOWA.

AGRICULTURAL IMPLEMENT.

SPECIFICATION forming part of Letters Patent No. 502,032, dated July 25, 1893.

Application filed February 16, 1893. Serial No. 462,628. (No model.)

*To all whom it may concern:*

Be it known that I, ALEXANDER CALDWELL, a citizen of the United States, residing in Essex, Page county, Iowa, have invented a new and useful Improvement in Agricultural Implements, of which the following is a specification.

My invention relates especially to agricultural implements employed for cultivating various kinds of products, particularly listed corn, and working upon a side hill; and has for its object the provision of a simple and effective implement, easy to operate and control, and of light draft.
To attain the desired end, my invention consists in certain novel and useful combinations or arrangements of parts, and peculiarities of construction and operation, all of which will be hereinafter first fully described, and then pointed out in the claims.

Figure 1:
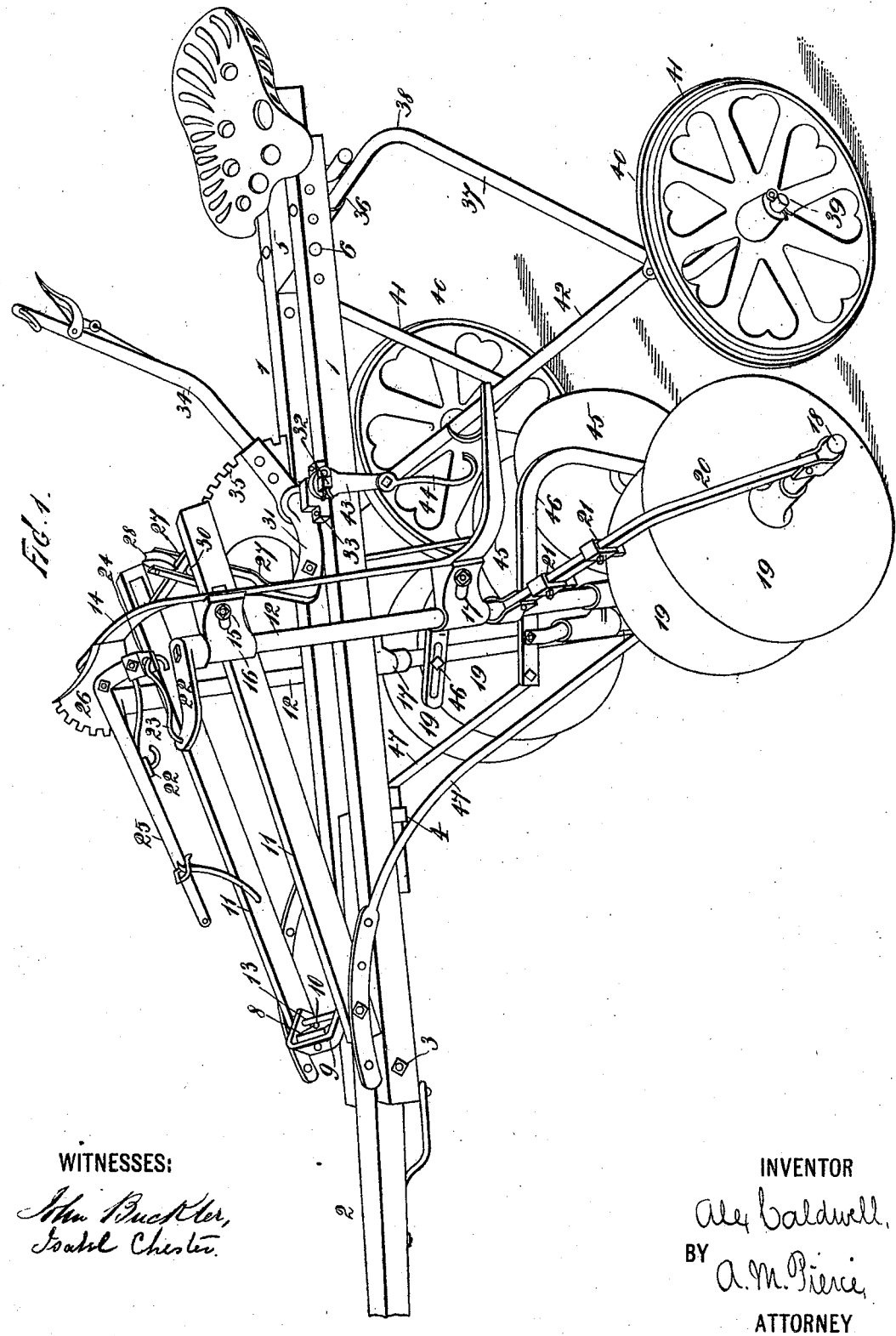
Figure 2:
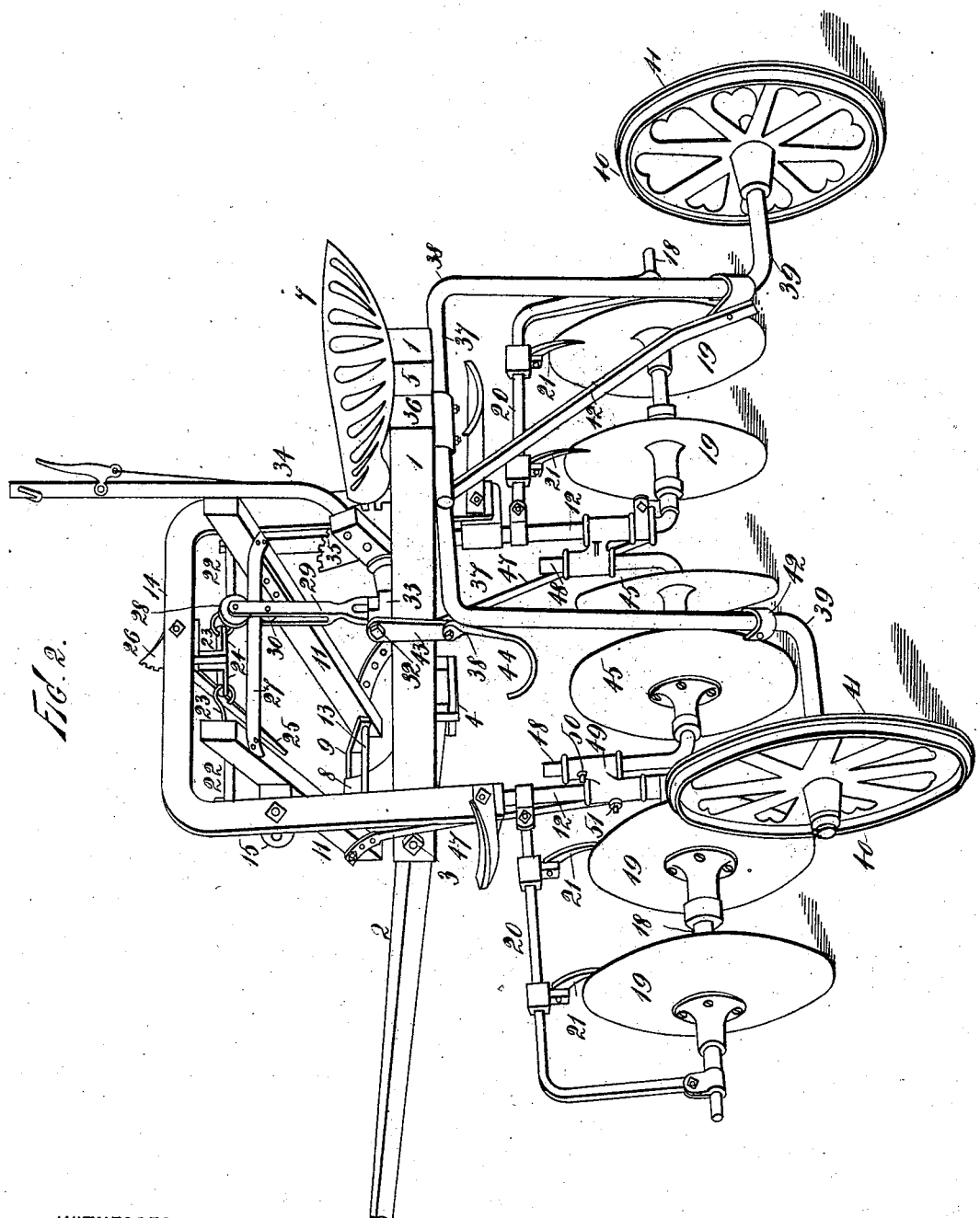

In the accompanying drawings Figure 1 is a side view and partial perspective of an implement constructed in accordance with my invention. Fig. 2 is a rear and partial perspective view thereof.

Like numerals of reference, wherever they occur, indicate corresponding parts in both the figures.

1, 1, are beams of wood, forming the hounds of the cultivator.

2 is the pole or tongue, passing between the hounds 1, being horizontally pivoted upon a bolt 3.

4 is a U shaped yoke, secured to the under sides of the hounds, 1, and forming a rest for the inner extremity of the pole 2. This yoke is to be used where a small sized team is employed with the implement, but when a large sized, or tall team is attached thereto, it should be removed in order that the weight of the implement shall not bear upon the neck-yoke.

5 is a block, adjustably secured between the rear ends of the hounds 1 by means of a bolt 6, this block serving the double purpose of holding the hounds apart the requisite distance, and forming an adjustable support for the driver's seat 7, which is mounted upon said block 5.
8 is a casting, secured to the hounds near their front ends. 9 is a yoke, pivoted at 10 to the upwardly projecting portion of said casting 8, and also secured to upwardly slanting bars 11, forming supports for disk standards, 12, by means of a cross-rod 13, which passes through eyes in the two arms of the yoke 9. By this arrangement, the disk standards, disks, and all the connected parts, are free to move in a vertical direction, and serving to accommodate the disks to the lay of the ground over which the implement is passing, independent of the position of the hounds.

14 is an arch, passing over the hounds and bars 11, said bars 11 being secured to this arch by means of brackets 15. Brackets 15 are provided with perforated projections 16 through which the disk standards 12 pass. 17 are other perforated brackets, also secured to the arch 14, and forming bearings for said standards 12. Standards 12 are bent outward at bottom, forming horizontal arms 18, whereon are rotatably mounted cultivating disks 19. I have shown in the drawings but two disks 19 upon each arm, but the number may be varied at pleasure, in order to accommodate the implement to the work to be done.

20 are bars, adjustably secured to the standards 12, passing to the outer extremities of the arms 18, and bearing adjustable cleaning knives 21, arranged to clean the cultivating disks of any adhering material.

22 are cranks, fixed to the tops of the standards 12, and engaging with links 23, which in turn engage with arms, 24, extending at each side from an operating lever, 25, pivoted to a notched segment, 26, secured at the top of the arch 14. By means of this arrangement, the standards 12 may be turned at any desired angle, thus causing the disks 19 to change their line of movement, and consequently greatly varying the throw of the earth in cultivation. In order to produce means for raising and lowering the standards 12, and causing the disks 19 to enter the earth a short or a great distance, while at the same time they are free to follow the variation of the surface of the ground being cultivated, a cross-bar 27 is adjustably secured to the under sides of the bars 11; upon this cross-bar plays a grooved pulley 28, mounted in a forked bearing piece 29; a second grooved pulley 30, mounted in the bearing piece 29, below the cross-bar 27, preventing the jumping up of the piece 29. At the lower extremity, piece 29 is pivoted to an arm, 31, mounted upon a crank rod 32, journaled at 33 upon the hounds 1.

34 is a regulating lever, connected to arm 31, and arranged to be held in any desired position by a notched segment 35.

36 are perforated blocks, mounted beneath the hounds 1, and forming bearings for independent rods 37, which are curved downward at 38 and outward at 39, forming axles for supporting wheels, 40. These wheels 40, are provided with a circumferential rib, 41, extending outward from the flat tread. Said ribs enter the ground, and prevent the slipping sidewise of the supporting wheels, thus insuring a straight forward movement of the implement, even when on a side hill. Extending from the axles at each side, are rods, 42, which engage with cranks, 43, mounted upon the rod 32. 44 are foot pieces extending downward from the said cranks 43. By this means, the position of the bearing wheels may be varied by simply pressing the feet against pieces 44, throwing the axles 39 forward or backward. In turning, or in raising the disks from the earth, the driver throws his weight upon the pieces 44, and at the same time pulls downward upon the lever 34. The result of this is to raise the disks, and throw the supporting wheels 40 forward, and thus moving the weight of the driver farther to the rear of the axles of said wheels, and giving leverage for raising the disks 19 from the earth.

In Fig. 1, 45 are shield disks, mounted upon arms 46, secured to the standards 12, and provided with adjustable connecting rods, 47, passing to the rod 13. In Fig. 2 these shields 45 are removed, and cutting stubble disks are substituted therefor. These disks are mounted upon arms 48, which pass through double sleeve pieces 49, said sleeve pieces being provided with set screws 50, and 51. These pieces 49, embrace the standards 12, as well as the arms 48, and by means of the set screws, the disks 45 may be set at any desired height or angle.

Having now fully described my invention, what I claim as new therein, and desire to secure by Letters Patent, is—

1. In a device of the character herein specified, the combination with the main supporting frame, of the cultivating disks 19, and the supporting wheels 40, provided with circumferential ribs 41, said supporting wheels being located in the rear of the cultivating disks, substantially as shown and described.

2. In a device of the character herein specified, the combination with the hounds 1, of the casting 8, yoke 9 pivoted thereto, and the bars 11, arranged substantially as shown and described.

3. In a device of the character herein specified, the combination with the support for the disk standards and disk, of a loose connection at the rear of said support, consisting of a bearing piece embracing a cross-bar, said bearing piece being provided with friction pulleys, as set forth, and means for raising, lowering and locking the parts in place, substantially as shown and described.

4. In a device of the character herein specified, the combination with the hounds 1, of the supporting axles 39, rods 42, cranks 43, and foot pieces 44, arranged to operate substantially as shown and described.

5. In a device of the character herein specified, the combination with the standards 12, of the double adjustable sleeve pieces 49, the arms 48, and disks 45, substantially as shown and described.

ALEX. CALDWELL.

Witnesses:
H. C. PATTERSON,
J. O. MACLEAN.